Patented Sept. 19, 1922.

1,429,573

UNITED STATES PATENT OFFICE.

CARLETON ELLIS, OF MONTCLAIR, NEW JERSEY.

SHORTENING AGENT.

No Drawing. Application filed January 23, 1919, Serial No. 272,629. Renewed February 15, 1922. Serial No. 536,819.

*To all whom it may concern:*

Be it known that I, CARLETON ELLIS, a citizen of the United States, and a resident of Montclair, in the county of Essex and State of New Jersey, have invented certain new and useful Improvements in Shortening Agents, of which the following is a specification.

This invention relates to a shortening or to a shortening and seasoning material adapted for use in the manufacture of bread and other food products and the invention will be illustrated especially with reference to the production of a product applicable in bread-making.

Ordinary bread, as prepared by bakers for general trade, is usually made with 2 to 4% of sugar, about 1½ to 1¾% of salt and perhaps 3% or so of lard or other shortening material. The percentage of sugar can be increased but ordinarily the amount of salt indicated is the maximum as greater quantities sometimes impair the fermentation and hence the flavor of the product. In the present invention it is an object to combine the shortening material with the sugar or salt or both to form a product which may be added directly to the flour or dough batch.

As a shortening agent I preferably employ hydrogenated or hardened oil, especially that having a high melting point. Hydrogenated oil melting between 50 and 62° C. is desirable and for example I may use hydrogenated cottonseed oil melting around 58 to 62° C. Likewise other vegetable oils in the hydrogenated state may be employed such as peanut, corn, soya bean oil and the like and mixtures of these oils or other hydrogenated animal and vegetable products adapted for the purpose.

Preferably the amount of hydrogenated oil employed should be proportioned to give the requisite shortening effect without the introduction of too much sugar or salt in case both of these substances are employed. Preferably also the hydrogenated oil is added to the sugar or sugar and salt in such a manner as to coat the particles of these water-soluble substances so that on contact with water the sugar and salt will dissolve leaving a shell of hydrogenated oil of a very finely extended or thin filmy character which readily mixes with the dough, and thus a distribution of the hydrogenated oil throughout the dough batch in an intimate manner is effected. This feature of using a water-soluble carrier for the hydrogenated oil constitutes a feature of one form of the present invention. The following formulas serve to illustrate the present invention:

Composition A. 3 parts of salt, 1 part of hydrogenated oil.

In preparing this material the salt may be dried and heated with the hydrogenated oil until the latter is well melted. These proportions afford a slight excess of hydrogenated oil, that is to say the salt does not absorb all the oil and it is preferable to stir the mixture while cooling so that a granular product is obtained with the oil uniformly distributed through the salt. This product may be ground to a fine powder and added to the bread batch or to the flour employed in making the latter.

The proportions employed in the foregoing are by weight.

Composition B. 10¼ parts of salt, 28 parts of granulated sugar, 7 parts hardened oil are heated, well stirred and ground after cooling. In this case the oil is well absorbed by the salt and sugar.

Composition C. 7½ parts of salt, 15 parts of granulated sugar, 5 parts of hardened oil are heated, well stirred and cooled, when the composition is ground. In place of granulated sugar powdered sugar may be employed. When used in the formula last given the amount of powdered or confectionery sugar is sufficient with the salt present to take up all of the molten hardened oil forming on stirring a granular mass which on cooling is readily ground.

In some cases the mixture may be modified by the addition of a leavening agent such as baking powder.

Various ways of incorporating the hydrogenated oil may be employed other than the method given of melting, mixing, cooling and grinding. For example the salt or sugar may be brought into contact with a spray of hydrogenated oil.

As stated, a feature of one form of the invention is the soluble character of the kernel or carrier for the hydrogenated oil having the very desirable function of going into solution on contact with water in the dough batch and leaving a thin film or shell of hydrogenated fat exposed to the kneading action of the mass causing the particles to be very well disseminated therethrough.

In place of hydrogenated oil other products may be employed in some cases such, for example, as stearine prepared by uniting ordinary stearic acid with glycerine. In some cases also it is possible to employ beef stearine of high melting point or other animal fat of this character, but preferably the invention is directed to the use of a shortening material containing only fat of vegetable origin free from the objections to which certain types of animal fats are open.

In its preferred form the product is a white or light-colored powder preferably ground to or employed of a fineness represented by 80 to 100 mesh.

What I claim is:—

1. A shortening agent containing hard hydrogenated oil and a pulverulent to granular water-soluble substance employed in the manufacture of food products, such hard oil being in the form of a shell upon the surface of the particles of such water-soluble substance.

2. A shortening agent containing hard hydrogenated oil and pulverulent to granular common salt, such hard oil being in the form of a shell upon the surface of the particles of salt.

3. A shortening agent comprising a hard fat and a pulverulent to granular water-soluble substance employed in the manufacture of food products, such hard fat being in the form of a shell on the surface of the particles of such water-soluble substance.

CARLETON ELLIS.